United States Patent [19]

Staples

[11] Patent Number: 5,066,049

[45] Date of Patent: Nov. 19, 1991

[54] LOCKOUT DEVICE FOR HOSE FITTING

[75] Inventor: Peter J. Staples, Newark, N.Y.

[73] Assignee: Parker Hannifin Corporation, Cleveland, Ohio

[21] Appl. No.: 612,765

[22] Filed: Nov. 13, 1990

[51] Int. Cl.$^5$ ............................................. F16L 55/10
[52] U.S. Cl. ......................................... 285/80; 285/81; 285/91; 285/315; 285/316
[58] Field of Search .................... 285/80, 81, 82, 91, 285/277, 315, 316

[56] References Cited

U.S. PATENT DOCUMENTS

| | | | |
|---|---|---|---|
| 2,436,206 | 2/1948 | Deming | 285/82 X |
| 2,489,919 | 11/1949 | Merriman | 285/82 X |
| 2,728,895 | 12/1955 | Quackenbush et al. | 285/81 X |
| 2,860,893 | 11/1958 | Clark | 285/277 X |
| 2,935,338 | 5/1960 | Mill, Jr. | 285/277 X |
| 3,337,244 | 8/1967 | Appleberry | 285/277 X |
| 3,359,015 | 12/1967 | Zahuranec | 285/316 X |
| 4,002,186 | 1/1977 | Fink et al. | 285/80 X |
| 4,527,816 | 7/1985 | Bresie et al. | 285/81 |
| 4,682,795 | 7/1987 | Rabushka et al. | 285/277 X |
| 4,826,215 | 5/1989 | Sullivan | 285/80 |

FOREIGN PATENT DOCUMENTS 2089918 6/1982 United Kingdom ................. 285/81

Primary Examiner—Randolph A. Reese
Assistant Examiner—Heather Chun
Attorney, Agent, or Firm—Ralph E. Jocke

[57] ABSTRACT

A lockout device (10) for a male hose fitting (54) has a body (14) with a bore (22) extending therethrough. A moveable sleeve member (32) is mounted on the body. A plurality of holding balls (30) extend into the bore. In a first position of the sleeve, the balls fully extend into the bore, and in a second position of the sleeve the balls are enabled to move radially outward. A hole (50) in the body enables a loop (52) of a conventional lock (12) to extend through the body. When the lock is installed the sleeve is held in the first position. With the lock removed the sleeve may be moved to the second position and the male hose fitting inserted into the bore. Once the hose fitting is inserted, the sleeve member is returned to the first position and the lock extended through the body. The male hose fitting cannot be removed from the device or connected to a source of compressed air as long as the lock remains installed on the lockout device.

9 Claims, 3 Drawing Sheets

LOCKOUT DEVICE FOR HOSE FITTING

TECHNICAL FIELD

This invention relates to quick connect/disconnect fluid couplings. Particularly, this invention relates to a device for preventing connection of a male quick connect fluid coupling to a source of fluid power such as compressed air so that the equipment supplied through the coupling must remain inoperable.

BACKGROUND ART

Many types of machines use fluid power for their operation. Compressed air is a common type of fluid power which may be used to operate pneumatic cylinders, air motors and a wide variety of other devices.

It is common to use hoses to connect pneumatic devices to a source of compressed air. For ease of connection, it is also common to use a quick connect/disconnect coupling to connect the hose to the compressed air supply. In most applications, a male fitting is positioned at the end of the hose and a female fitting is in communication with the source of supply. This insures that the hose is open to atmosphere when it is disconnected from the female fitting. In addition, valves are commonly built into the female portion of the coupling so that the flow of compressed air is shut off as soon as the male fitting is removed.

It is sometimes necessary to shut down equipment that is powered by compressed air. Reasons for shutting down the equipment include the necessity of making repairs which cannot be made while the equipment is running. Inadvertent starting of the equipment while it is being worked on could cause damage to the equipment or injury to the persons attempting to repair it.

When pneumatic equipment is turned off for repair, it is desirable to disconnect the equipment completely from the source of compressed air. This insures that the pneumatic components are deactivated. When the equipment is connected with the hose having a quick connect/disconnect coupling, the easiest way to disconnect the equipment from the supply of compressed air is to disconnect the hose.

There is always a possibility that someone who is not aware that the equipment is being worked on may see the disconnected hose and reconnect it to the compressed air supply. This would most likely happen in multi-shift operations where the persons who started the repair process have gone home without informing the individuals working on subsequent shifts. Of course, stickers or tags may be used to indicate that the hose fitting should not be reconnected. However, such items may fall off the hose and can be rendered illegible in a dirty environment.

Thus, there exists a need for a lockout device for a hose fitting that prevents a pneumatic hose from being connected to a compressed air supply when the equipment supplied by the hose is being repaired.

DISCLOSURE OF INVENTION

It is an object of the present invention to provide a lockout device for a hose fitting that prevents connection of the hose to a supply of compressed air.

It is a further object of the present invention to provide a lockout device for a hose fitting that is secure and cannot be removed without the knowledge of the individual who installed it.

It is a further object of the present invention to provide a lockout device for a hose fitting that may be quickly installed and removed from the hose.

It is a further object of the present invention to provide a lockout device for a hose fitting that is not adversely affected by shock, vibration or dirt.

It is a further object of the present invention to provide a lockout device for a hose fitting that is reliable and inexpensive.

Further objects of the present invention will be made apparent in the following Best Modes for Carrying Out Invention and the appended claims.

The foregoing objects are accomplished by a lockout device for a hose fitting having a cylindrical body with a bore therein. The bore has a first opening at a first end of the body, and is sized to accept a conventional male hose fitting. The body of the device also has a tail piece which includes a second opening into the bore.

The body of the device includes a plurality of circumferentially spaces holes. A ball is positioned in each hole and is movable therein. The holes and balls are sized so that the inner surface of the balls extend into the bore in the body but cannot fall through the holes. In addition, the outer wall of the body is approximately even with the outer surface of the balls.

A longitudinally movable sleeve is mounted on the body. The sleeve has a first inside surface which, in a first position, is adjacent the outside surfaces of the balls. As a result, when the sleeve is in the first position, the balls are held fully extended into the bore. The sleeve also includes a recess cut into the underside thereof. When the sleeve is moved to a second position, the recess enables the balls to move radially outward. The sleeve also has a rear face which overlies the tailpiece of the body.

The tail piece of the body has a lock accepting hole extending therethrough. The lock accepting hole is adjacent the rear face of the sleeve when the sleeve is in the first position. A loop of a conventional key lock may be passed through the hole in the tail piece of the body.

In use, a male hose fitting of conventional design is inserted into the bore. By moving the sleeve to the second position, the balls are enabled to retract to allow a protrusion on the male fitting to pass. Thereafter, when the sleeve is returned to the first position, the balls are fully extended into the bore by the action of the sleeve member, which holds the male fitting therein. With the sleeve returned to the first position, a loop of a key lock may be passed through the hole in the tailpiece of the body. With the loop of the lock in the tailpiece, the sleeve cannot be moved to the second position to release the male fitting. The lock may be locked, and the key removed, making it impossible to connect the hose.

With a lockout device of the present invention installed, the hose fitting cannot be connected to a supply of compressed air. In addition, the male fitting is open to atmosphere through the second opening in the body of the lockout device so that pneumatic components on the machine such as cylinders and air motors may be freely moved to facilitate repair.

BEST MODES FOR CARRYING OUT INVENTION

Figure 1:
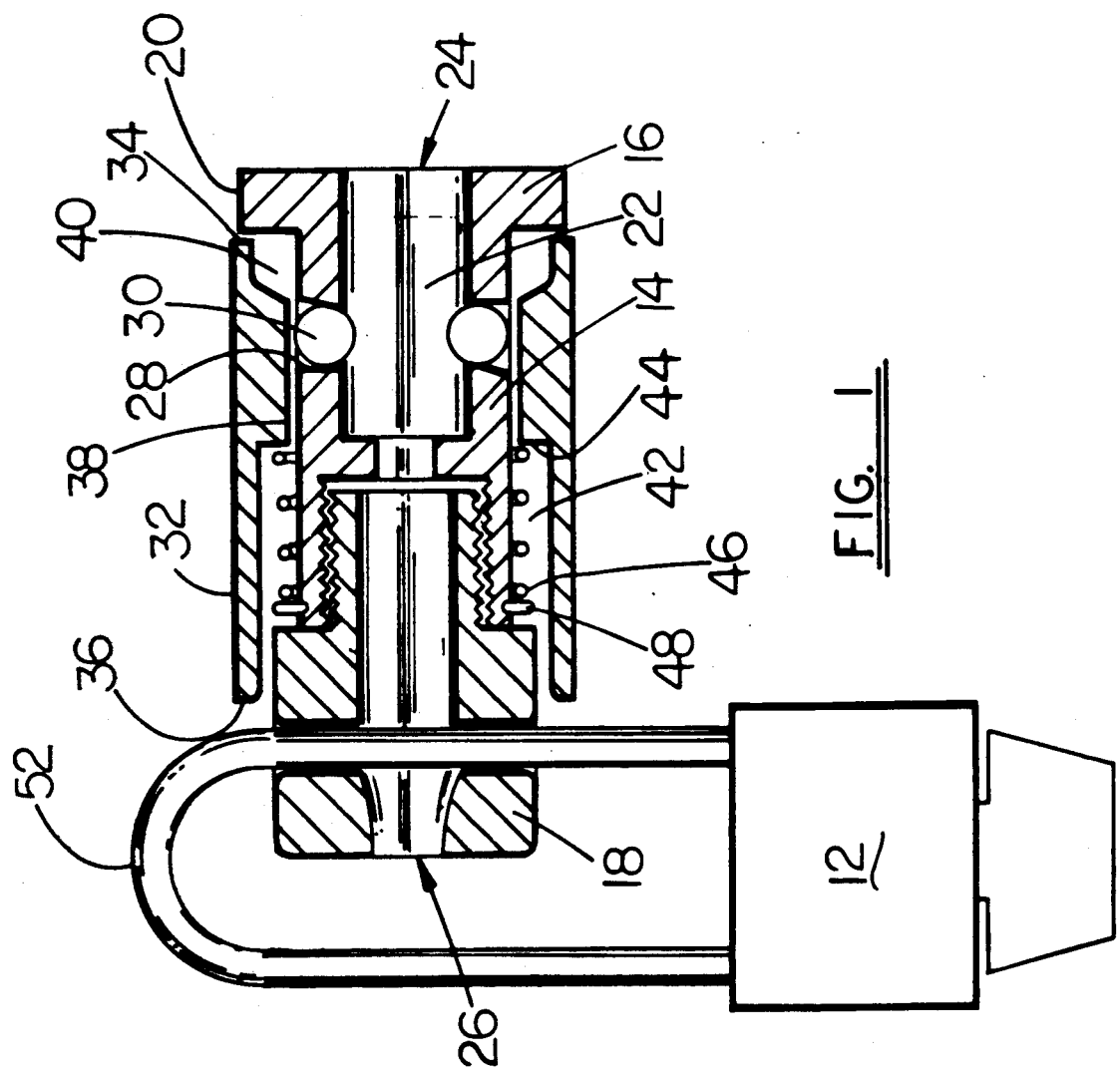
FIG. 1 is a cross sectional view of the lockout device of the present invention.

Referring now to the drawings and particularly to FIG. 1, there is shown therein the lockout device of the present invention generally indicated 10. The lockout device is used in conjunction with conventional locking means such as a key lock generally indicated 12.

The lockout device has a cylindrical body 14. Body 14 includes a head piece 16 and a tail piece 18 which are threaded together as shown. Head piece 16 has thereon an outward extending flange 20.

Figure 2:
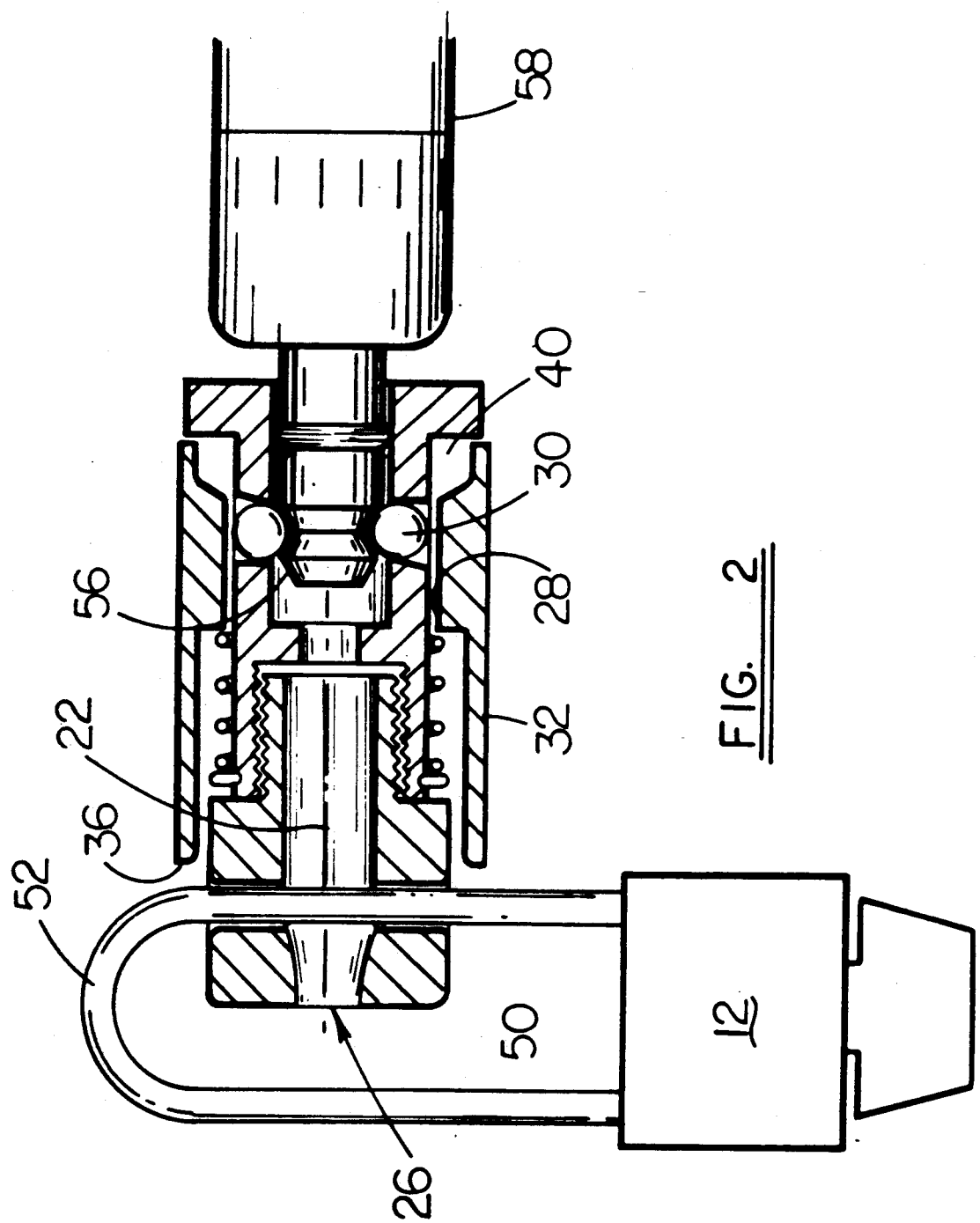
FIG. 2 is a cross sectional view of the lockout device of the present invention with a conventional male hose fitting positioned and locked therein.

A bore, generally indicated 22, extends through body 14. Bore 22 extends from a first opening 24 in head piece 16 to a second opening 26 in the tail piece. Opening 24 is sized to accept a conventional male hose fitting as shown in FIG. 2.

A plurality of circumferentially spaced holes 28 extend about body 14. Holes 28 also open into bore 22. Holes 28 are tapered to be smaller in the area where they open into the bore. A plurality of balls 30 are positioned in holes 28. Balls 30 are sized to fit into holes 28 and be movable therein, however they are large enough so that they cannot fall completely through the tapered holes into the bore. The body is also sized so that the tops of balls 30 extend outward to a level even with the outside of the body when they are fully nested in the holes. As later explained, balls 30 serve as holding bodies for holding the male fitting in the bore.

A movable sleeve member 32 is mounted on body 14. Sleeve 32 has a front face 34 adjacent flange 20, and a rear face 36 overlying the tail piece of the body. Sleeve 32 also has a first inside surface 38 which, when the sleeve is in a first position shown in FIG. 1, overlies balls 30. Sleeve 32 also includes a recess area 40 which, when the sleeve is in the first position, is disposed from the balls.

Sleeve 32 also includes a counter bore 42 terminating at a step 44. A coil spring 46 which serves as biasing means, is positioned in counter bore 42. A snap ring 48 positioned in a recess (not separately shown) in the tail piece, holds coil spring 46 in the counter bore.

A transverse hole 50 extends through tail piece 18. Hole 50 serves as lock member accepting means and accepts a loop 52 of lock 12. As shown in FIG. 1, the diameter of loop 52 is smaller than the diameter of bore 22. Therefore when loop 52 is positioned in hole 50, it does not block the flow of fluid through bore 22. As shown in FIG. 1 when sleeve 32 is in the first position, rear face 36 at the back end of the sleeve is adjacent to hole 50. As a result, when loop 52 is extended through hole 50, the loop is adjacent and in abutting relation with the rear face 36 of sleeve 32.

Figure 3:
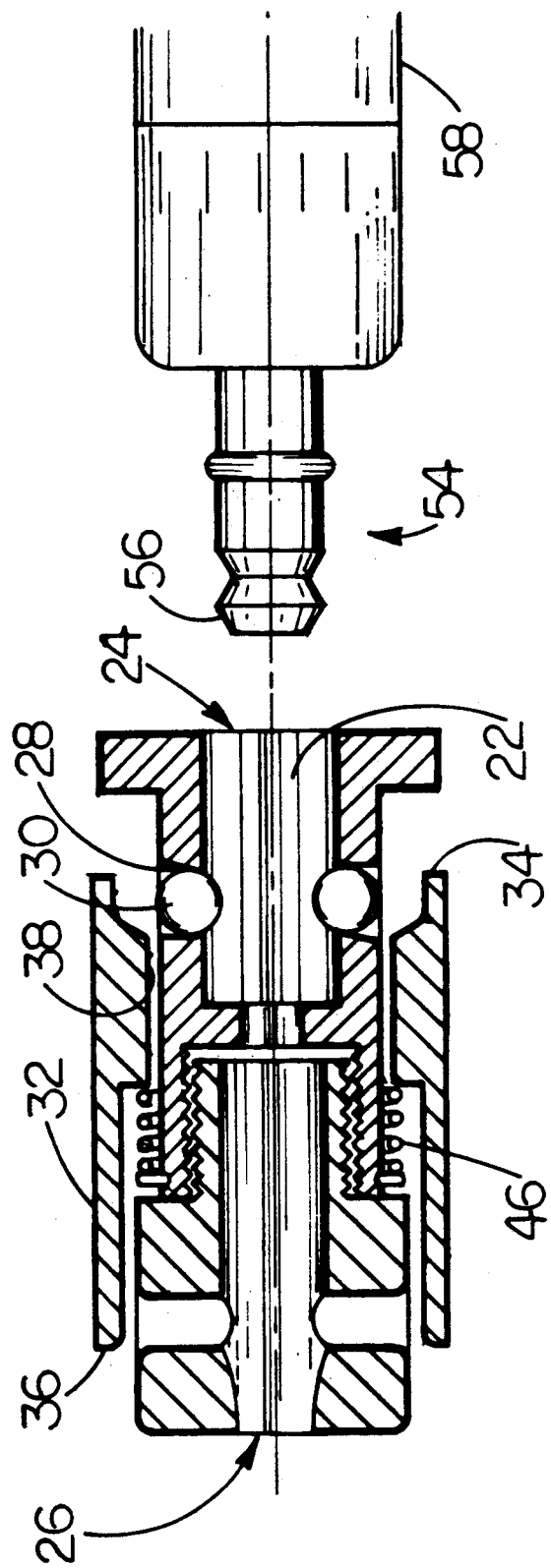
FIG. 3 is a cross sectional view of the lockout device of the present invention in the unlocked position.

The operation of the lockout device of the preferred embodiment of the present invention is now explained with reference to FIGS. 2 and 3. With lock 12 removed from the body, sleeve 32 may be retracted to the left and shown in FIG. 3 against the biasing force of spring 46. When the sleeve is retracted, first inside surface 38 is moved away from balls 30 so that the balls may move radially outward in the direction of arrows A in FIG. 3 into recess 40. Recess 40 of sleeve 32 is sized so that the balls may not fall out of the sleeve.

A male hose fitting 54 includes a radially extending protuberance 56 thereon. Fitting 54 is of conventional design and is connected to a hose 58 in a usual manner.

With sleeve 32 in the retracted second position, fitting 54 may be fully inserted into bore 22 as shown in FIG. 2. Once the fitting is inside the bore, sleeve 32 may be returned to the first position as shown in FIG. 2 wherein the first inside surface 38 of the sleeve maintains balls 30 fully extended into the bore. The balls abut protuberance 56 to hold the male fitting in the bore.

With fitting 54 positioned in the bore and the sleeve 32 returned to the first position, the loop 52 of lock 12 is installed in hole 50 as shown in FIG. 2. With the lock installed, sleeve 32 cannot be moved to the second position because the rear face 36 of the sleeve is adjacent to the loop of the lock. As a result, the lockout device cannot be disengaged from the male hose fitting 54. This prevents anyone from inadvertently connecting the hose fitting to a source of compressed air and further insures that the pneumatic equipment served by the hose cannot be operated.

Because the bore 22 of the lockout device is open to atmosphere, any compressed air that may have been in the hose at the time it was disconnected is vented. Further, because the fitting is open to atmosphere through the lockout device, any compressed air that is released into the hose from the pneumatic equipment is also exhausted. This makes it possible to freely move pneumatic cylinders, air motors or other devices that may need to be serviced on the machine.

Thus, the lockout device of the present invention achieves the above stated objectives, eliminates difficulties encountered in the use of prior devices, solves problems and obtains the desirable results described herein.

In the foregoing description certain items have been used for brevity, clarity and understanding, however, no unnecessary limitations are to be implied therefrom because such terms are used for descriptive purposes and are intended to be broadly construed. Moreover, the descriptions and illustrations herein are examples and the invention is not limited to the exact details shown or described.

Having described the features, discoveries and principles of the invention, the manner in which it is constructed and operated, and the advantages and useful results obtained; the new and useful structures, devices, elements, arrangements, parts, combinations, systems, equipment, operations and relationships are set forth in the appended claims.

I claim:

1. A lockout apparatus to prevent delivery of fluid through a male hose fitting, said male hose fitting normally connectable to a mating female hose fitting to enable delivery of fluid therethrough, comprising:
   a generally cylindrical body, said body including a bore having a first opening for accepting said male hose fitting, said body further including a tail portion, said body adapted to prevent said body from being placed in mating fluid connection with said holding means in said bore for selectively holding said male fitting in said bore;
   a generally cylindrical moveable member overlying said body and mounted for movement longitudinally thereon, said moveable member in operative connection with said holding means, in a first position of said member said holding means holding said fitting in said bore and in a second position said fitting enabled to be removed from said bore, said tail portion of said body extending beyond said moveable member when said member is in the first position;

a lock member;

lock member accepting aperture means in said tail portion of said body for accepting said lock member, said lock member preventing movement of said moveable member from said first position when said lock member is accepted in said lock member accepting aperture means.

2. The apparatus according to claim 1 wherein said lock member accepting aperture means is a hole extending through said tail portion of said body.

3. The apparatus according to claim 2 wherein said movable member has a rear face, said rear face adjacent said hole in the tail portion of said body when said movable member is in the first position.

4. The apparatus according to claim 3 wherein said lock member is the loop of a lock and said hole is sized for accepting said loop.

5. The apparatus according to claim 4 and further comprising a second opening to said bore, whereby said bore is open to atmosphere.

6. The apparatus according to claim 5 wherein said male fitting includes a radially extending protuberance and said holding means of said apparatus includes a plurality of holding bodies for engaging said protuberance, and wherein said movable member includes a first inside surface, said first inside surface adjacent said holding bodies in said first position of said moveable member, whereby said holding bodies are held in engagement with said protuberance of said male fitting.

7. The apparatus according the claim 6 wherein said movable member includes a recess, said recess adjacent said holding bodies when said movable member is in the second position, whereby said holding bodies are enabled to disengage said protuberance and said male fitting enabled to be removed from said bore.

8. The apparatus according the claim 7 and further comprising biasing means for biasing said movable member toward the first position.

9. A lockout for preventing connection of a male hose fitting to a mating connectable female hose fitting, to prevent the delivery of fluid through said male hose fitting, comprising:

a body, said body including a bore for accepting said male hose fitting, said body further including a tail portion having a hole therein;

holding means in said bore for selectively holding said male fitting in said bore;

a moveable member overlying and mounted for movement longitudinally on said body, said moveable member in operative connection with said holding means, in a first position of said moveable member said holding means holding said male fitting in said bore, and in a second position of said moveable member disposed in a first direction from said first position, said male fitting enabled to be removed from said bore, said moveable member including a face; in the first position of said member said hole in said tail portion of said body adjacent and disposed in the first direction of said face; and a lock selectable between locked and unlocked conditions, said lock including a locking member, said locking member irremovably accepted in said hole in said tail portion of said body when said lock is in the locked condition, and said locking member removable from said hole when said lock is in the unlocked condition;

whereby when said lock is in the locked condition, said locking member extends in said hole adjacent said face and prevents movement of said moveable member to said second position, whereby said male fitting is held in said body and connection of said male fitting to said female fitting is prevented.

* * * * *